US012023293B2

(12) United States Patent
Anvar

(10) Patent No.: US 12,023,293 B2
(45) Date of Patent: Jul. 2, 2024

(54) DEVICES FOR COMPRESSING HUMAN PROSTATE AND METHOD FOR USING SAME

(71) Applicant: Abbas Anvar, Encinitas, CA (US)

(72) Inventor: Abbas Anvar, Encinitas, CA (US)

( * ) Notice: Subject to any disclaimer, the term of this patent is extended or adjusted under 35 U.S.C. 154(b) by 594 days.

(21) Appl. No.: 17/172,887

(22) Filed: Feb. 10, 2021

(65) Prior Publication Data

US 2021/0244608 A1 Aug. 12, 2021

Related U.S. Application Data

(60) Provisional application No. 62/972,821, filed on Feb. 11, 2020.

(51) Int. Cl.

| | |
|---|---|
| ***A61H 21/00*** | (2006.01) |
| ***A61H 7/00*** | (2006.01) |
| ***A61H 23/02*** | (2006.01) |

(52) U.S. Cl.

CPC ............. *A61H 21/00* (2013.01); *A61H 7/001* (2013.01); *A61H 23/02* (2013.01); *A61H 2201/0149* (2013.01); *A61H 2201/0192* (2013.01); *A61H 2201/1253* (2013.01); *A61H 2205/083* (2013.01)

(58) Field of Classification Search

CPC ............ A61H 21/00; A61H 2201/1253; A61H 2205/083; A61H 23/02; A61H 19/00; A61H 19/30; A61H 19/34; A61H 19/40; A61H 19/44; A61B 2018/00547; A61M 2210/166

See application file for complete search history.

(56) References Cited

U.S. PATENT DOCUMENTS

| | | | | |
|---|---|---|---|---|
| 5,904,660 A * | 5/1999 | Kim | A61H 1/00 | 601/118 |
| 7,077,817 B2 | 7/2006 | Young et al. | | |
| 7,819,824 B2 | 10/2010 | Sarvazyan et al. | | |
| 8,747,323 B2 | 6/2014 | Matsumura et al. | | |
| 9,737,458 B1 * | 8/2017 | Olivares | A61H 21/00 | |
| 10,057,464 B2 | 8/2018 | Poquet et al. | | |
| 2005/0096693 A1 * | 5/2005 | Rosinke | A61H 7/001 | 606/204 |

(Continued)

FOREIGN PATENT DOCUMENTS

| | | |
|---|---|---|
| CN | 203749442 | 8/2014 |
| KR | 200399016 Y1 * | 10/2005 |

OTHER PUBLICATIONS

International Search Report & Written Opinion dated Feb. 10, 2021 for PCT/US2021/017469.

*Primary Examiner* — Michael R Reid
*Assistant Examiner* — Sarah B Lederer
(74) *Attorney, Agent, or Firm* — Lewis Kohn & Walker LLP; Kari Moyer-Henry

(57) ABSTRACT

A kit comprising tools for compressing a prostate of a human subject including a rectal compression probe for applying force in the ventral direction on the anterior wall of the rectum for transmitting a force in the ventral direction upon the posterior side of the prostate. The assembly further includes an abdominal compression probe for applying force in the dorsal direction on the hypogastric region of the abdomen for transmitting a force in the dorsal direction upon the anterior side of the prostate. Also disclosed is a method for compressing a prostate of a human subject.

3 Claims, 11 Drawing Sheets

(56) References Cited

U.S. PATENT DOCUMENTS

| | | | | |
|---|---|---|---|---|
| 2011/0264019 | A1* | 10/2011 | Park | A61H 23/00<br>601/108 |
| 2014/0088469 | A1* | 3/2014 | Wise | A61N 1/0512<br>601/46 |

* cited by examiner

DEVICES FOR COMPRESSING HUMAN PROSTATE AND METHOD FOR USING SAME

RELATED APPLICATIONS

This application is a United States utility patent application which claims the benefit of priority from U.S. Provisional Patent Application No. 62/972,821, filed on Feb. 11, 2020, the disclosure of which is hereby incorporated by reference in its entirety.

BACKGROUND

The prostate gland encircles the male urethra just below the urinary bladder and can be felt during a rectal exam. The function of the prostate is to produce prostatic fluid and to express such prostatic fluid into the ejaculate during ejaculation. Prostatic fluid constitutes approximately 30% of the total volume of semen. Prostatic fluid contains is slightly alkaline.

A healthy male prostate is slightly larger than a walnut. However, in elderly men, the prostate can enlarge to the point where urination becomes difficult. The condition is called benign prostatic hyperplasia. If the prostate grows too large, it can constrict the urethra and impede the flow of urine, making urination difficult and painful and, in extreme cases, completely impossible. The condition of benign prostatic hyperplasia may be treated by removing the prostate or ablating a portion thereof.

Alternatively, benign prostatic hyperplasia may be treated by prostate massage. Expression of the alkaline prostatic fluid from the prostate gland can reduce its enlargement and reduce the restriction of the urethra, so as to enable full voiding of the bladder. The prostate may be accessed for massage purposes from the anterior wall of the rectum.

Conventionally, a prostate massager is employed for massaging the prostate gland. The prostate massager accesses the prostate via the anus and rectum. An exemplary prostate massage device is disclosed by U.S. Pat. No. 2,445,974.

Unfortunately, the access afforded to the prostate using a prostate massager is limited due to anatomical constraints. These anatomical constraints, in turn, limit the therapeutic effectiveness of the massage.

What was needed was a method and device that provided enhanced access to the prostate for massage purposes.

SUMMARY OF THE INVENTION

The first aspect of the invention is directed to a kit comprising an assembly of tools for compressing a prostate of a human subject. The prostate has an anterior side and a posterior side. The human subject has a rectum with an anterior wall dorsal to the posterior side of the prostate;

and an abdomen with a hypogastric region ventral to the posterior side of the prostate. The assembly includes a rectal compression probe for applying force in the ventral direction on the anterior wall of the rectum for transmitting a force in the ventral direction upon the posterior side of the prostate. The assembly further includes an abdominal compression probe for applying force in the dorsal direction on the hypogastric region of the abdomen for transmitting a force in the dorsal direction upon the anterior side of the prostate. Simultaneous use of the rectal compression probe and the abdominal compression probe for simultaneously transmitting ventrally directed force on the posterior side of the prostate and dorsally directed force on the anterior sides of the prostate causes the prostate to compress.

In a first preferred embodiment of the first aspect of the invention, the rectal compression probe is an intra-rectal compression probe employable for transmitting ventrally directed force on the posterior side of a prostate of a human subject. The human subject has a rectum with an anterior wall dorsal to the posterior side of the prostate. The intra-rectal compression probe includes a rod having a proximal end and a distal end and a circumference adapted for insertion into the human rectum, the distal end having a rounded shape for contacting the anterior wall of the rectum adjacent to the posterior side of the prostate, and a flat base attached to the proximal end of the rod for stabilizing the rod, the attachment of the rod to the base forming an angle within a range of between 20 and 60 degrees from horizontal. Optionally, the rectal compression probe may have a fixed angle of attachment between the rod and the flat base. Or, alternatively, the rectal compression probe has an adjustable angle of attachment between the rod and the flat base within a range of between 20 and 60 degrees from horizontal.

In a second preferred embodiment of the first aspect of the invention, the rectal compression probe is an intra-rectal compression probe employable for transmitting ventrally directed force on the posterior side of a prostate of a human subject. The intra-rectal compression probe includes a rod having a proximal end and a distal end and a circumference adapted for insertion into the human rectum, the distal end having a rounded shape for contacting the anterior wall of the rectum adjacent to the posterior side of the prostate. The intra-rectal compression probe further includes a spherical base attached to the proximal end of the rod and having a flat bottom for supporting and stabilizing the intra-rectal compression probe, the attachment of the rod to the spherical base forming an angle between 20 and 60 degrees with the flat bottom.

In a third preferred embodiment of the first aspect of the invention, the rectal compression probe is an extra-rectal compression probe employable for transmitting ventrally directed force on the posterior side of a prostate of a human subject. The human subject has an anus caudal to the posterior side of the prostate. The extra-rectal compression probe includes a non-insertion rod having a proximal end and a distal end and a circumference sufficiently great to prevent insertion into the anus, the distal end having a rounded shape for contacting the anus, the proximal end of the rod having a flat truncated shape for stabilizing the rod.

In a fourth preferred embodiment of the first aspect of the invention, the abdominal compression probe is employable for transmitting dorsally directed force on the anterior side of the prostate of a human subject. The human subject has two hands, one chin, and an abdomen with a hypogastric region ventral to the anterior side of the prostate, the abdominal compression probe for applying force in the dorsal direction on the hypogastric region of the abdomen for transmitting a force in the dorsal direction upon the anterior side of the prostate. The abdominal compression probe includes a shaft having a proximal end and a distal end, the distal end having a rounded shape for contacting the hypogastric region of the subject's abdomen and applying dorsally directed force thereupon. The abdominal compression probe further includes a vibrational motor having two opposing lateral sides, a top side, and a bottom side. The bottom side of the vibrational motor is attached to the proximal end of the shaft for transmitting vibration from the vibration motor to the shaft. The abdominal compression probe further includes two opposing handles. Each handle is transversely attached respectively to one of the lateral sides of the vibrational motor and is adapted to be held by the subject's hands for holding the vibrational motor and for transmitting dorsally directed force upon the vibrational motor and the shaft. The abdominal compression probe further includes a telescoping vertical member having a proximal end and a distal end. The proximal end of the telescoping vertical member is attached to the top side of the vibrational motor, the distal end of the telescoping vertical member having a rounded shape adapted for engagement below the subject's chin for enabling the subject to exert downward force with the chin upon the telescoping vertical member and the vibrating motor. The telescoping vertical member has an adjustable length for adapting the length between the vibrating motor and the subject's chin. Application of dorsally directed force by the subject upon the handles and the telescoping vertical member while simultaneously contacting the distal end of the shaft upon the hypogastric region of the subject's abdomen and while simultaneously operating the vibrational motor transmits both vibrations and force in the dorsal direction upon the anterior side of the prostate.

In a fifth preferred embodiment of the first aspect of the invention, the abdominal compression probe is employable for transmitting dorsally directed force on the anterior side of the prostate of a human subject. The human subject has two hands, one chin, and an abdomen with a hypogastric region ventral to the anterior side of the prostate. The abdominal compression probe is employed for applying force in the dorsal direction on the hypogastric region of the abdomen for transmitting a force in the dorsal direction upon the anterior side of the prostate. The abdominal compression probe includes a shaft having a proximal end and a distal end, the distal end having a rounded shape for contacting the hypogastric region of the subject's abdomen and applying dorsally directed force thereupon. The abdominal compression probe further includes a telescoping vertical member having a proximal end and a distal end. The proximal end of the telescoping vertical member is attached to the shaft. The distal end of the telescoping vertical member has a rounded shape adapted for engagement below the subject's chin for enabling the subject to exert downward force with the chin upon the telescoping vertical member and the shaft. The telescoping vertical member has an adjustable length for adapting the length between the shaft and the subject's chin. Application of dorsally directed force by the subject upon the telescoping vertical member while simultaneously contacting the distal end of the shall upon the hypogastric region of the subject's abdomen transmits force in the dorsal direction upon the anterior side of the prostate.

A second aspect of the invention is directed to an intra-rectal compression probe employable for transmitting ventrally directed force on the posterior side of a prostate of a human subject. The human subject has a rectum with an anterior wall dorsal to the posterior side of the prostate. The intra-rectal compression probe comprises a rod having a proximal end and a distal end and a circumference adapted for insertion into the human rectum, the distal end having a rounded shape for contacting the anterior wall of the rectum adjacent to the posterior side of the prostate, and a flat base attached to the proximal end of the rod for stabilizing the rod, the attachment of the rod to the base forming an angle within a range of between 20 and 60 degrees from horizontal. In a first preferred embodiment of the second aspect of the invention, the rectal compression probe has a fixed angle of attachment between the rod and the flat base. In a second preferred embodiment of the second aspect of the invention, the rectal compression probe has an adjustable angle of attachment between the rod and the flat base within a range of between 20 and 60 degrees from horizontal.

A third aspect of the invention is directed to an intra-rectal compression probe employable for transmitting ventrally directed force on the posterior side of a prostate of a human subject. The human subject has a rectum with an anterior wall dorsal to the posterior side of the prostate. The intra-rectal compression probe comprises a rod having a proximal end and a distal end and a circumference adapted for insertion into the human rectum, the distal end having a rounded shape for contacting the anterior wall of the rectum adjacent to the posterior side of the prostate, and a spherical base attached to the proximal end of the rod and having a flat bottom for supporting and stabilizing the intra-rectal compression probe, the attachment of the rod to the spherical base forming an angle between 20 and 60 degrees with the flat bottom.

A fourth aspect of the invention is directed to an extra-rectal compression probe employable for transmitting ventrally directed force on the posterior side of a prostate of a human subject. The human subject has an anus caudal to the posterior side of the prostate. The extra-rectal compression probe comprises a non-insertion rod having a proximal end and a distal end and a circumference sufficiently great to prevent insertion into the anus, the distal end having a rounded shape for contacting the anus, the proximal end of the rod having a flat truncated shape for stabilizing the rod.

A fifth aspect of the invention is directed to an abdominal compression probe employable for transmitting dorsally directed force on the anterior side of the prostate of a human subject. The human subject has two hands, one chin, and an abdomen with a hypogastric region ventral to the anterior side of the prostate. The abdominal compression probe is employable for applying force in the dorsal direction on the hypogastric region of the abdomen for transmitting a force in the dorsal direction upon the anterior side of the prostate. The abdominal compression probe comprises a shaft having a proximal end and a distal end, the distal end having a rounded shape for contacting the hypogastric region of the subject's abdomen and applying dorsally directed force thereupon. The abdominal compression probe further comprises a vibrational motor having two opposing lateral sides, a top side, and a bottom side. The bottom side of the vibrational motor is attached to the proximal end of the shaft for transmitting vibration from the vibration motor to the shaft. The abdominal compression probe further comprises two opposing handles. Each handle is transversely attached respectively to one of the lateral sides of the vibrational motor and is adapted to be held by the subject's hands for holding the vibrational motor and for transmitting dorsally directed force upon the vibrational motor and the shaft. The abdominal compression probe further comprises a telescoping vertical member having a proximal end and a distal end. The proximal end of the telescoping vertical member is attached to the top side of the vibrational motor. The distal end of the telescoping vertical member has a rounded shape adapted for engagement below the subject's chin for enabling the subject to exert downward force with the chin upon the telescoping vertical member and the vibrating motor. The telescoping vertical member has an adjustable length for adapting the length between the vibrating motor and the subject's chin. Application of dorsally directed force by the subject upon the handles and the telescoping vertical member while simultaneously contacting the distal end of the shaft upon the hypogastric region of the subject's abdomen and while simultaneously operating the vibrational motor transmits both vibrations and force in the dorsal direction upon the anterior side of the prostate.

A sixth aspect of the invention is directed to an abdominal compression probe employable for transmitting dorsally directed force on the anterior side of the prostate of a human subject. The human subject has two hands, one chin, and an abdomen with a hypogastric region ventral to the anterior side of the prostate. The abdominal compression probe is employable for applying force in the dorsal direction on the hypogastric region of the abdomen for transmitting a force in the dorsal direction upon the anterior side of the prostate. The abdominal compression probe comprises a shaft having a proximal end and a distal end, the distal end having a rounded shape for contacting the hypogastric region of the subject's abdomen and applying dorsally directed force thereupon, and a telescoping vertical member having a proximal end and a distal end. The proximal end of the telescoping vertical member is attached to the shaft, the distal end of the telescoping vertical member having a rounded shape adapted for engagement below the subject's chin for enabling the subject to exert downward force with the chin upon the telescoping vertical member and the shaft. The telescoping vertical member has an adjustable length for adapting the length between the shaft and the subject's chin. Application of dorsally directed force by the subject upon the telescoping vertical member while simultaneously contacting the distal end of the shaft upon the hypogastric region of the subject's abdomen transmits force in the dorsal direction upon the anterior side of the prostate.

A seventh aspect of the invention is directed to a method for compressing a prostate of a human subject. The prostate has an anterior side and a posterior side. The human subject has a rectum with an anterior wall dorsal to the posterior side of the prostate; and an abdomen with a hypogastric region ventral to the posterior side of the prostate. The method comprises the following two steps: In the first step, force is applied with an intra-rectal compression probe inserted into the rectum. The force is applied in the ventral direction onto the anterior wall of the rectum for transmitting force in the ventral direction upon the posterior side of the prostate. In the second step, force is applied, simultaneously with the first step, with an abdominal compression probe. The force is applied in the dorsal direction on the hypogastric region of the abdomen for transmitting force in the dorsal direction upon the anterior side of the prostate. Simultaneous use of the intra-rectal compression probe and the abdominal compression probe for simultaneously transmitting ventrally directed force on the posterior side of the prostate and dorsally directed force on the anterior sides of the prostate causes the prostate to compress. In a first preferred mode of the seventh aspect of the invention, in the second step, the abdominal compression probe is motorized for applying force onto the hypogastric region of the abdomen. In a second preferred mode of the seventh aspect of the invention, in the second step, the abdominal compression probe is not motorized for applying force onto the hypogastric region of the abdomen.

An eighth aspect of the invention is directed to a method for compressing a prostate of a human subject. The prostate has an anterior side and a posterior side. The human subject has an anus posterior side of the prostate and an abdomen with a hypogastric region ventral to the posterior side of the prostate. The method comprises the following two steps. In the first step, force is applied with an extra-rectal compression probe in abutting contact with the anus. The force is applied ventrally across the anus onto the posterior side of a prostate of a human subject. In the second step, force is applied, simultaneously with the first step, with an abdominal compression probe for applying force in the dorsal direction on the hypogastric region of the abdomen for transmitting a force in the dorsal direction upon the anterior side of the prostate. Simultaneous use of the extra-rectal compression probe and the abdominal compression probe for simultaneously transmitting ventrally directed force on the posterior side of the prostate and dorsally directed force on the anterior sides of the prostate causes the prostate to compress. In a first preferred mode of the eighth aspect of the invention, in the second step, the abdominal compression probe is motorized for applying force onto the hypogastric region of the abdomen. In a second preferred mode of the eighth aspect of the invention, in the second step, the abdominal compression probe is not motorized for applying force onto the hypogastric region of the abdomen.

BRIEF DESCRIPTION OF THE DRAWINGS

FIG. 20 is a plan view illustrating the rectal compression probe in FIG. 8 positioned on a chair during use.

DETAILED DESCRIPTION

The invention is directed to tools and methods for applying compression pressure on the prostate by simultaneously transmitting ventrally directed force on the posterior side of the prostate and dorsally directed force on the anterior side of the prostate.

The ventrally directed force on the posterior side of the prostate is achieved with a rectal compression probe. The rectal compression probe may be either intra rectal or extra rectal. The intra rectal compression probe is inserted into the rectum during use. The extra rectal compression probe is positioned below the rectum during use, but is not inserted into the rectum.

Figure 1:
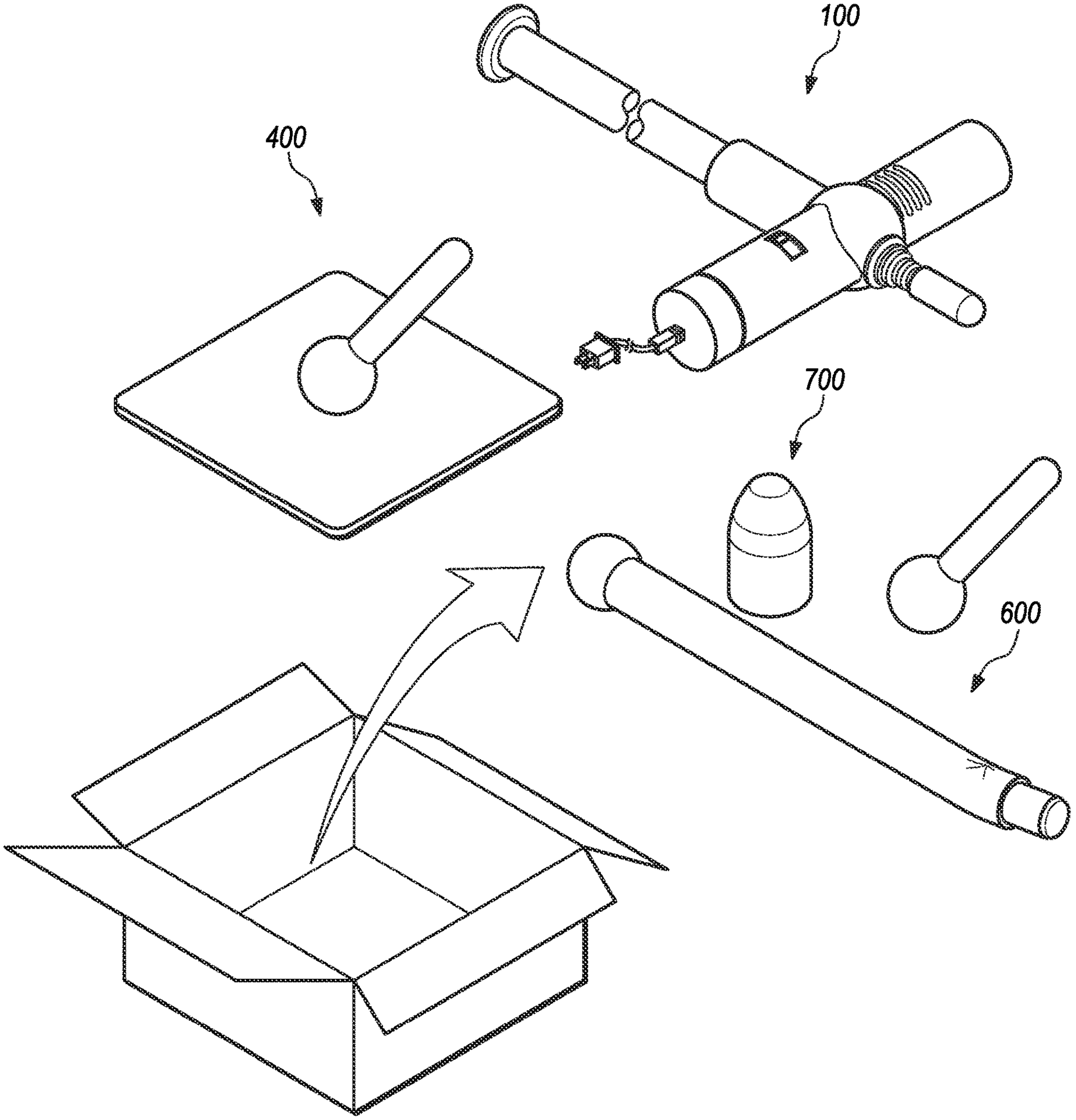
FIG. 1 is an exploded view of a kit illustrating a kit comprising an assembly of tools for compressing a prostate of a human subject. The tools of the kit have been removed from a box from which they are contained. The kit includes two abdominal compression probes, one with a vibrator and another without a vibrator. The kit also includes two intra rectal compression probes, one having a spherical base with a flat bottom and another having a planar base. The kit further includes an extra rectal compression probe.
Figure 2:
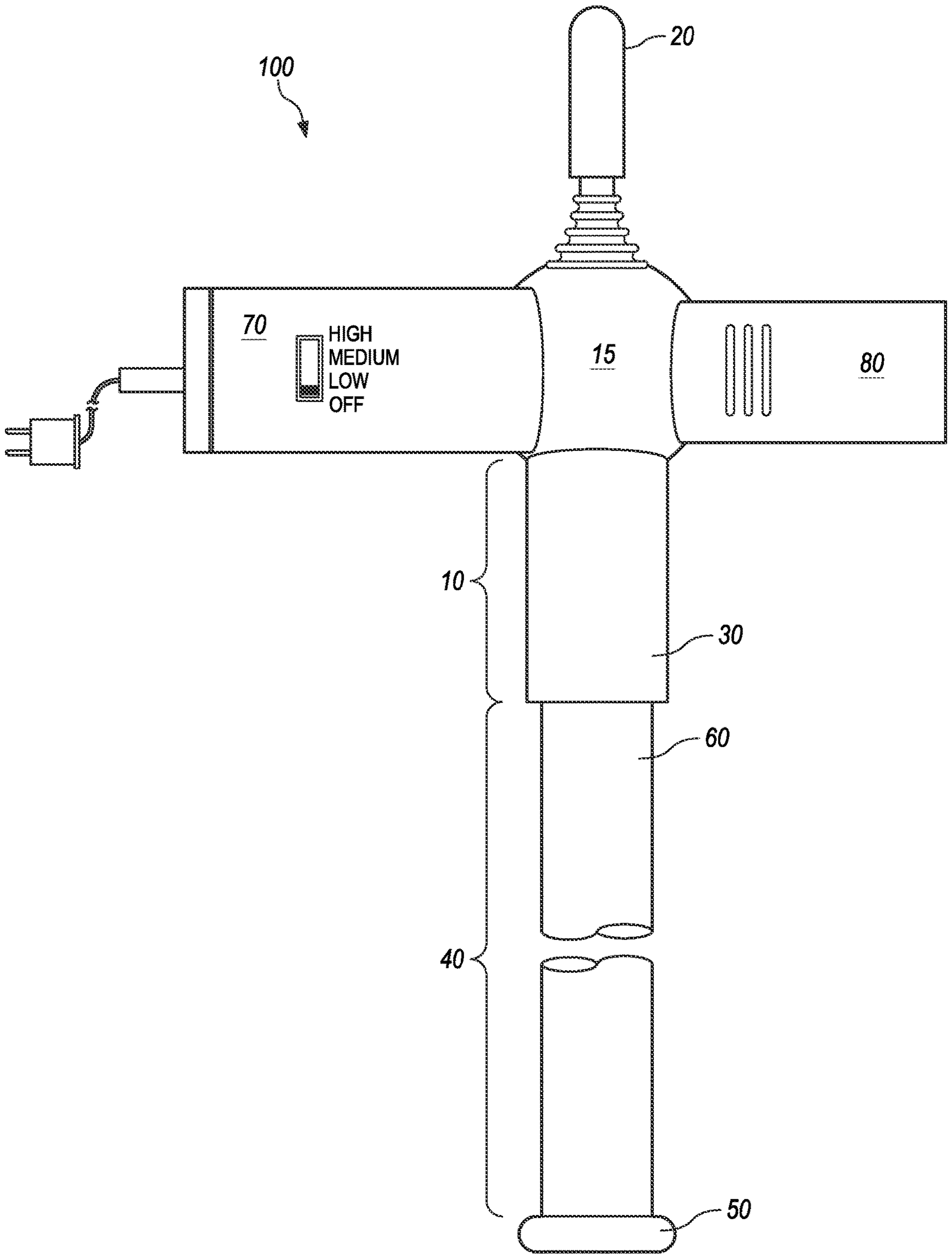
FIG. 2 is a plan view illustrating the side view of the abdominal compression probe in FIG. 1, having a vibrator.
Figure 3:
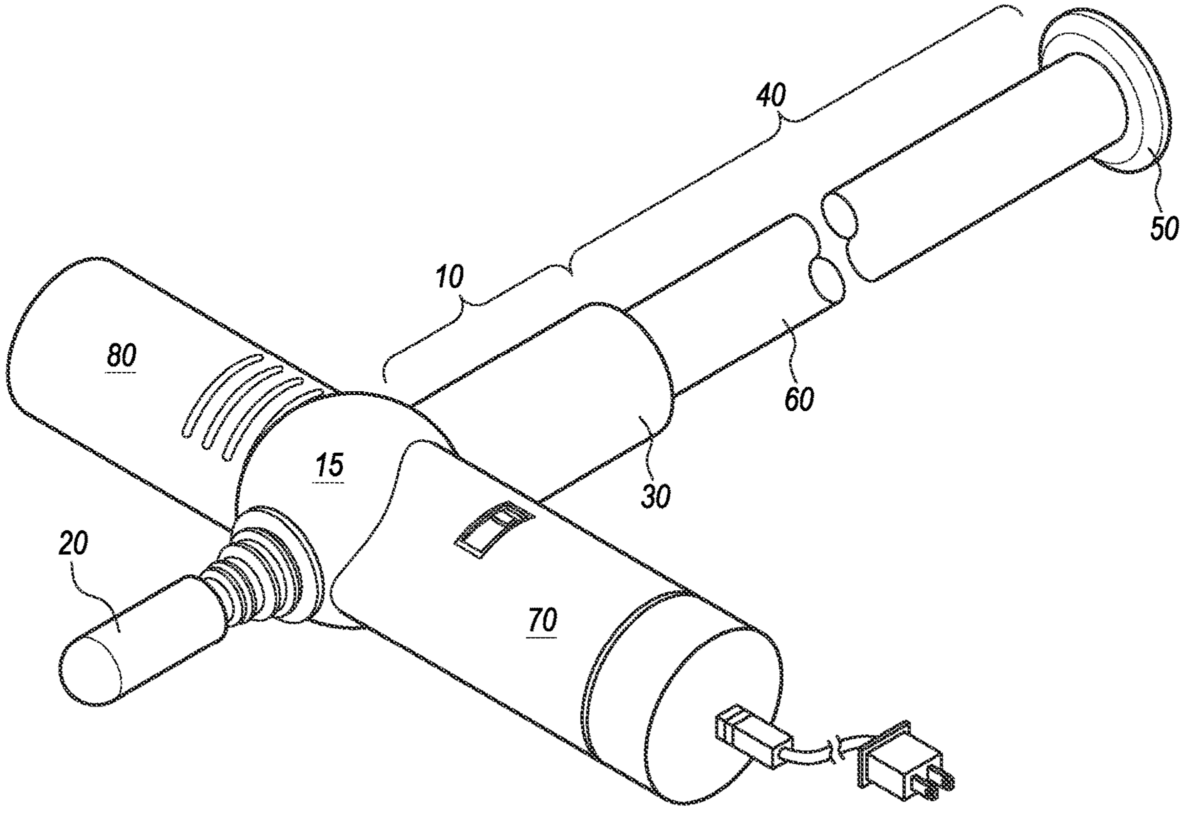
FIG. 3 is a perspective view of the abdominal compression probe in FIG. 2.
Figure 4:
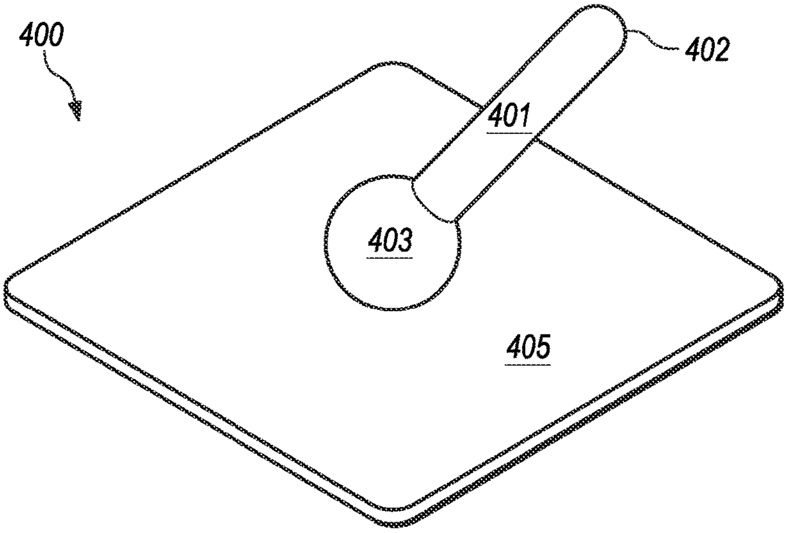
FIG. 4 is a perspective view of the intra rectal compression probe in FIG. 1 having a flat rectangular base.
Figure 5:
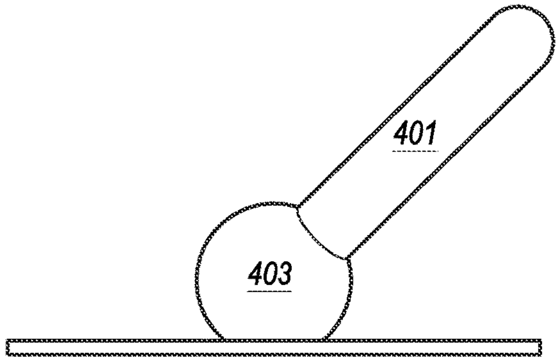
FIG. 5 is a plan view illustrating a side view of the intra rectal compression probe in FIG. 4.
Figure 6:
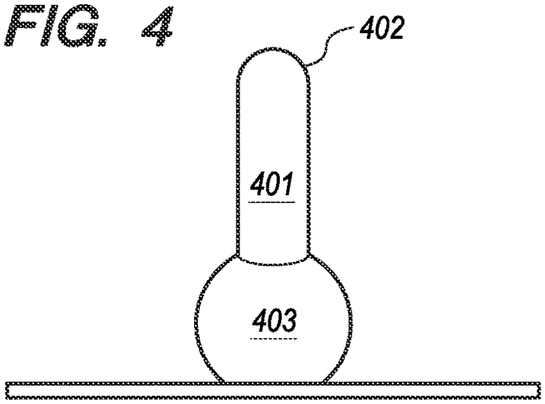
FIG. 6 is a plan view illustrating another side view of the intra rectal compression probe in FIG. 4.
Figure 7:
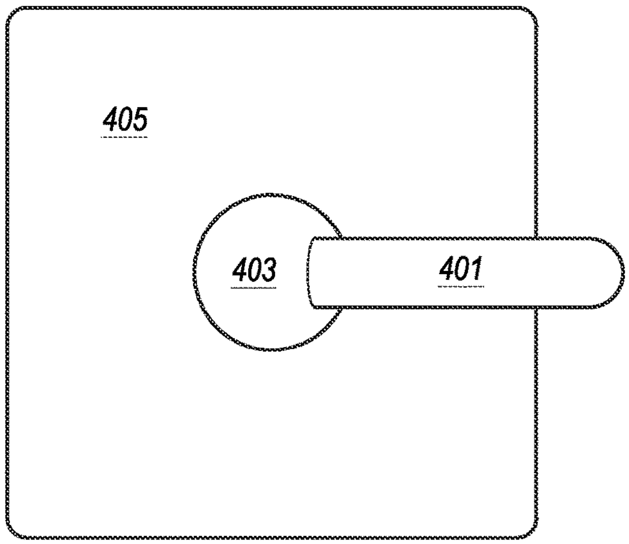
FIG. 7 is a plan view illustrating a top view of the intra rectal compression probe in FIG. 4.
Figure 8:
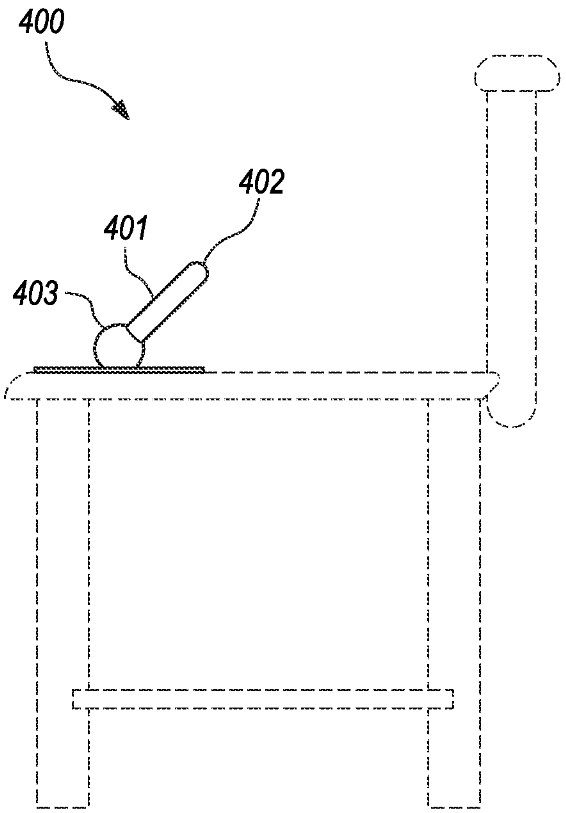
FIG. 8 is a plan view illustrating the rectal compression probe in FIG. 5 positioned on a chair prior to use.
Figure 9:
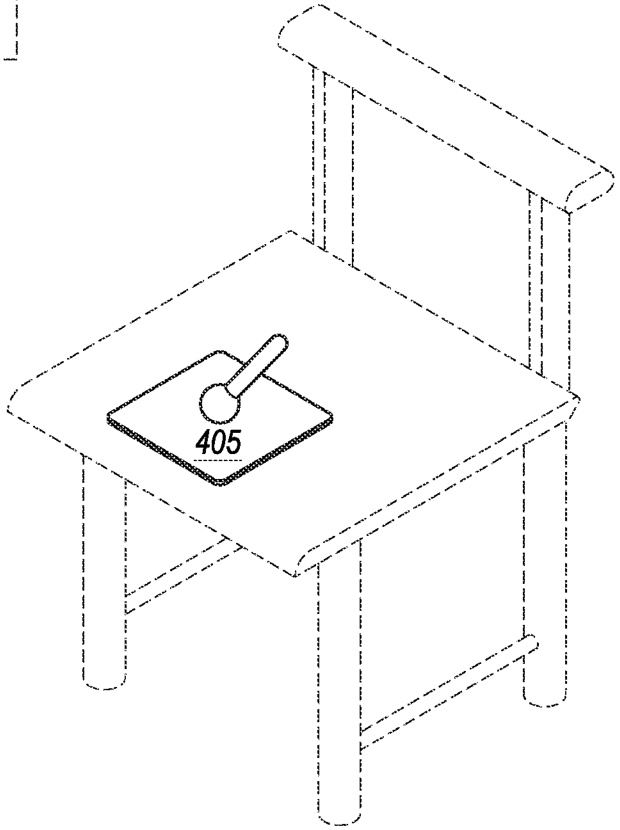
FIG. 9 is a perspective view of the intra rectal compression probe and chair illustrated in in FIG. 8.

An abdominal compression probe 100 is illustrated in FIGS. 2 and 3. Abdominal compression probe 100 is comprised of shaft 10 having a proximal end 30 and a distal end 20 having a rounded shape. Abdominal compression probe 100 is further comprised of a telescoping member 40 having a proximal end 60 and a distal end 50 wherein proximal end 60 is attached to shaft 10. Distal end 50 of telescoping member 40 has a rounded shape for engagement below a user's chin. Abdominal compression probe 100 is used to apply force in the dorsal direction on the gastric region of the abdomen. A user places the compression end 20 against the hypogastric region of the abdomen and gently applies pressure in the dorsal direction by exerting a downward force on distal end 50 of the telegraphing member 40 and shaft 10. Telegraphing member 40 has an adjustable length for adapting to the length between shaft 10 and a user's chin. The application of the distal force upon the hypogastric region of the user's abdomen transmits force in the dorsal direction upon the anterior side of the prostate. Abdominal compression probe 100 is further comprised of a vibrational motor 15 having two opposing handles 70, 80 transversely attached to motor 15 and adapted to be held by a user's hands. Vibrational motor 15 transmits vibration to shaft 10 and distal end 20 for the transmission of vibration to the hypogastric region of the user's abdomen and thereby to the anterior side of the prostate.

Intra rectal compression probes are illustrated in FIGS. 4-16. There are two types of Intra rectal compression probes, viz., 1. probes that are attached to a flat support base, as illustrated in FIGS. 4-12; and 2. probes that are attached to a sphere having flat bottom, as illustrated in FIGS. 13-16. During use, the intra rectal compression probe is inserted into the rectum for transmitting ventrally directed force on the posterior side of the prostate, as illustrated in s. 20B and 20A.

Figure 10:
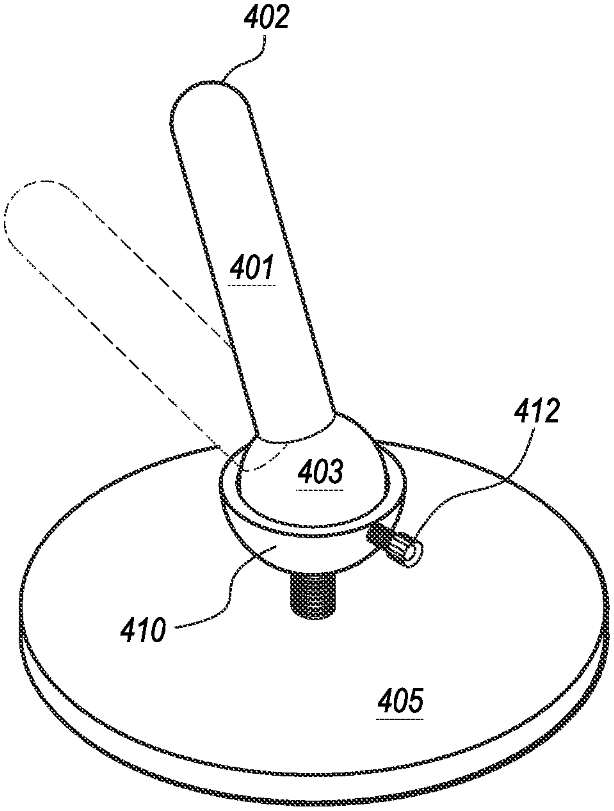
FIG. 10 is a perspective view of an alternative embodiment of the intra rectal compression probe having a flat circular base and an adjustable attachment between the base and the probe for controlling the angle between the base and the probe.
Figure 11:
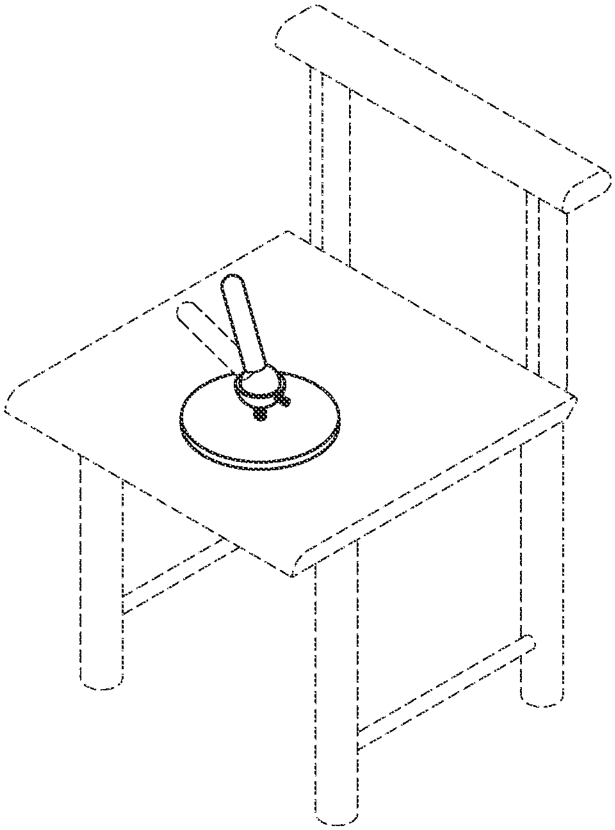
FIG. 11 is a perspective view of the intra rectal compression probe in FIG. 10 having a flat circular base and an adjustable attachment to the probe for controlling its angle.
Figure 12:
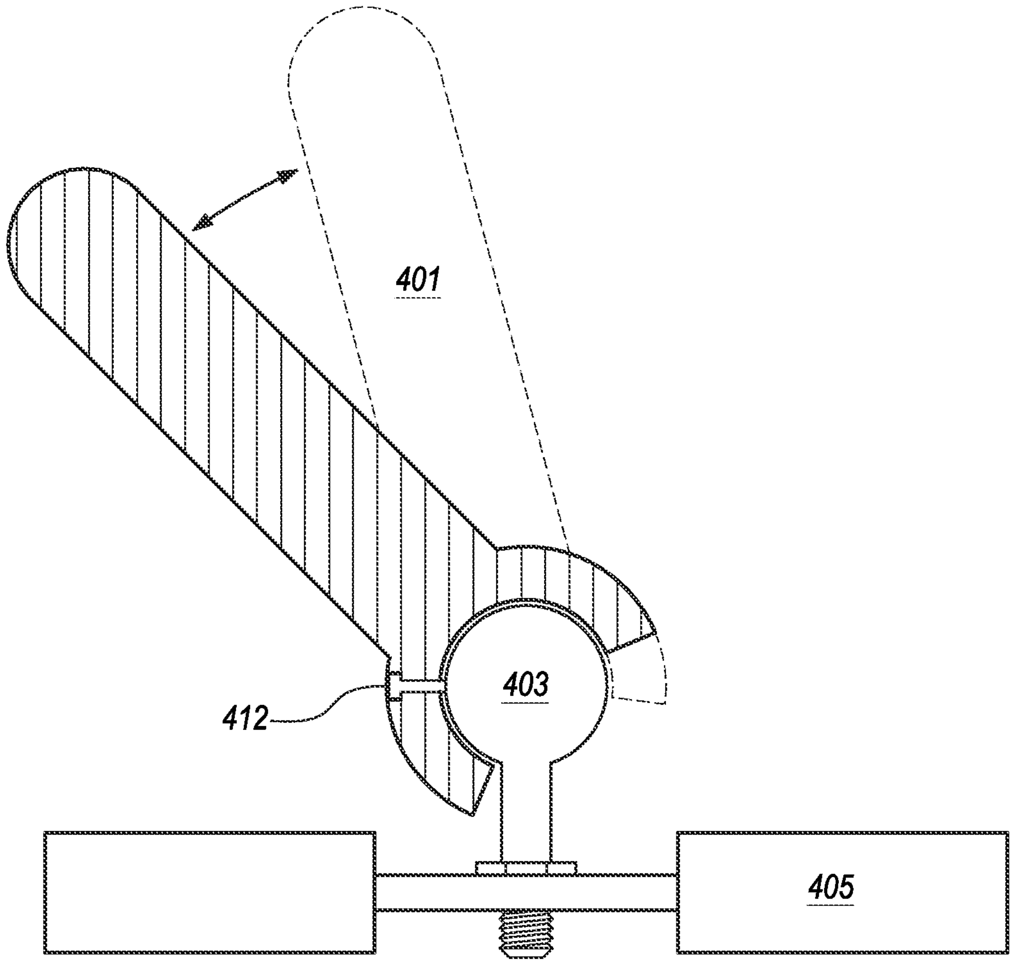
FIG. 12 is a sectional view of the intra rectal compression probe in FIG. 10 illustrating the adjustable attachment between the base and the probe for controlling its angle.
Figure 13:
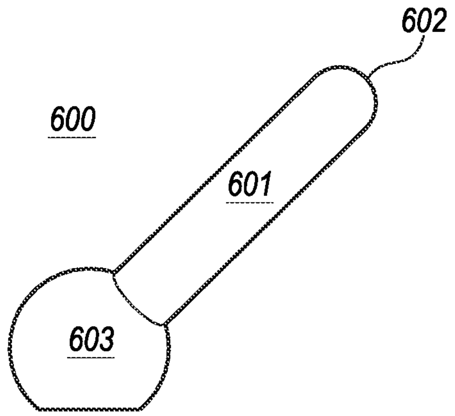
FIG. 13 is a plan view illustrating a side view of the intra rectal compression probe in FIG. 1 having a spherical base with a flat bottom.
Figure 14:
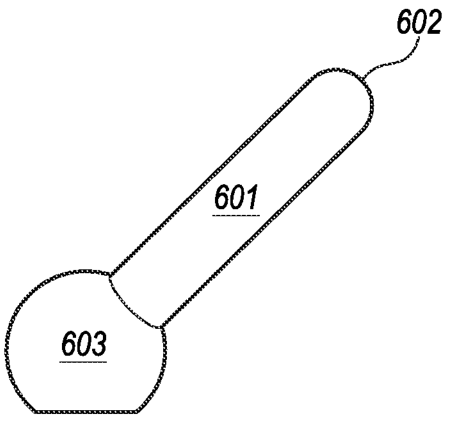
FIG. 14 is a plan view illustrating the same side view of the intra rectal compression probe in FIG. 13, indicating the length of the probe "A" and the angle between the probe and the flat surface of its spherical base, "B."
Figure 15:
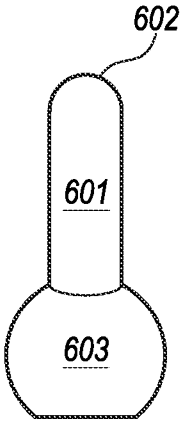
FIG. 15 is a plan view illustrating another side view of the intra rectal compression probe in FIG. 13.
Figure 16:
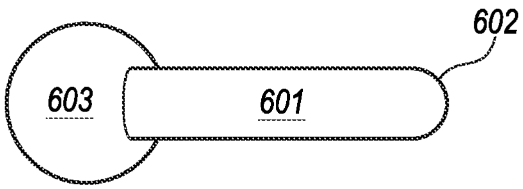
FIG. 16 is a plan view illustrating a top view of the intra rectal compression probe in FIG. 13.

A first type of rectal compression probe 400 is illustrated in FIG. 4-7. Probe 400 is an intra-rectal probe comprised of a rod 401 having a proximal end and a distal end and a circumference adapted for insertion into a human rectum. Distal end 402 is round for contacting the anterior wall of the rectum adjacent to the posterior side of a human prostate. Probe 400 further has a spherical base 403 attached to the proximal end of rod 401. Attachment of rod 401 to spherical base 403 forms an angle B of between 20 and 60 degrees with a support base 405. Spherical base 403 of rod 401 is further attached to support base 405. Probe 400 is adapted to apply force in the ventral direction upon the posterior side of the prostate. FIG. 8-11 demonstrate exemplary placement of probe 400 on a chair in preparation for use. FIG. 10-12 illustrate an alternative embodiment of probe 400 wherein support base 405 is a flat circular base and an adjustable attachment 410 between the base and the probe allows for controlling the angle between base 405 and rod 401. FIG. 12 is a sectional view of alternative probe 400 having an angle. Alternative probe 400 further includes a screw lock 412 which when unscrewed releases pressure on spherical base 403 and allows for the rotation of spherical base 403 to the desired angle.

A second type of rectal compression probe 600 is illustrated in FIG. 13-16. Probe 600 is an intra-rectal probe comprised of a rod 601 having a proximal end and a distal end and a circumference adapted for insertion into a human rectum. Distal end 602 is round for contacting the anterior wall of the rectum adjacent to the posterior side of a human prostate. Probe 600 further has a spherical base 603 attached to the proximal end of rod 601 and having a flat bottom for supporting and stabilizing probe 600. Attachment of rod 601 to spherical base 603 forms an angle B of between 20 and 60 degrees from horizontal. Probe 600 is adapted to apply force in the ventral direction upon the posterior side of the prostate.

Figure 17:
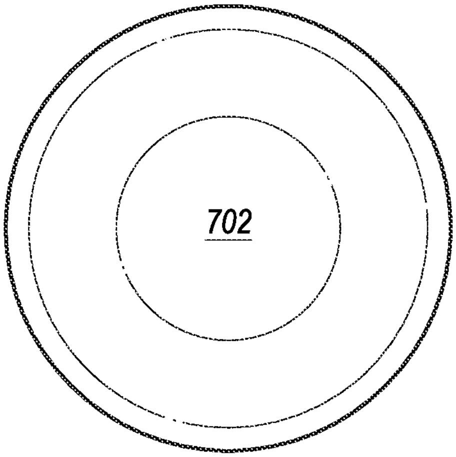
FIG. 17 is a plan view illustrating the top of the extra rectal compression probe shown in FIG. 1.
Figure 18:
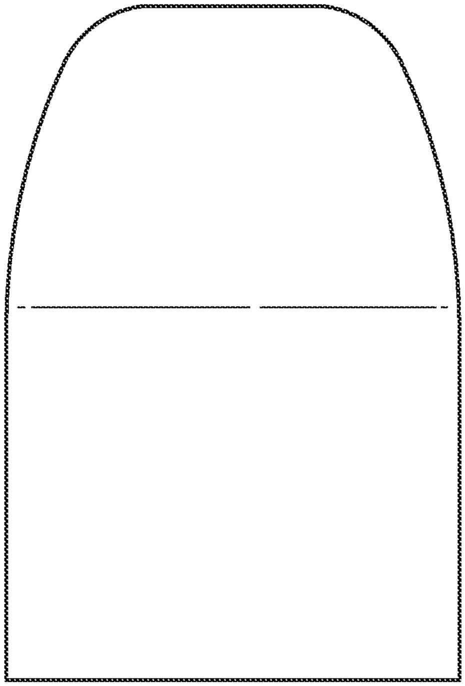
FIG. 18 is a plan view illustrating the side of the extra rectal compression probe shown in FIG. 17.
Figure 19:
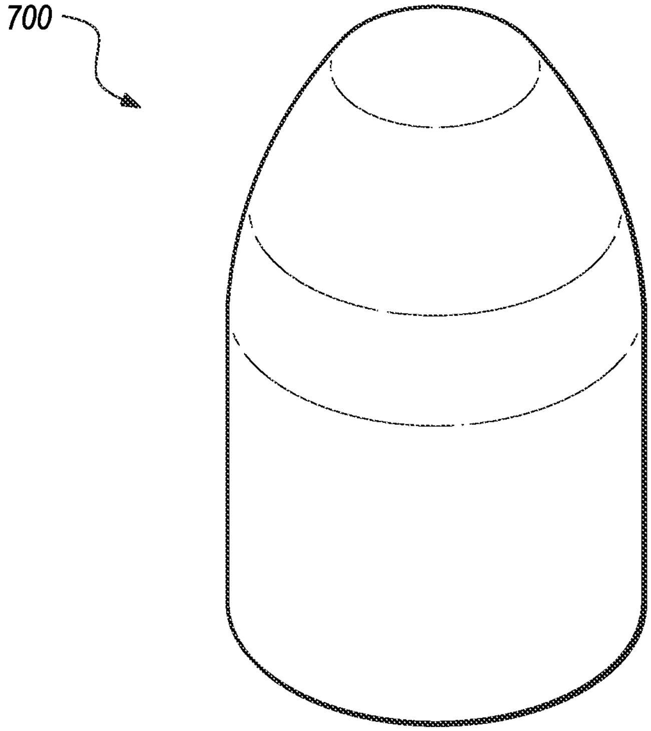
FIG. 19 is a perspective view illustrating the extra rectal compression probe shown in FIG. 18.
Figure 20A:
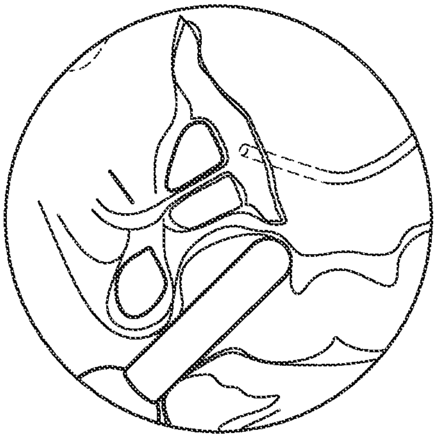
FIG. 20A is an expanded sectional view illustrating the rectal compression probe in FIG. 20B during use and transmitting ventrally directed force on the posterior side of the prostate.
Figure 20B:
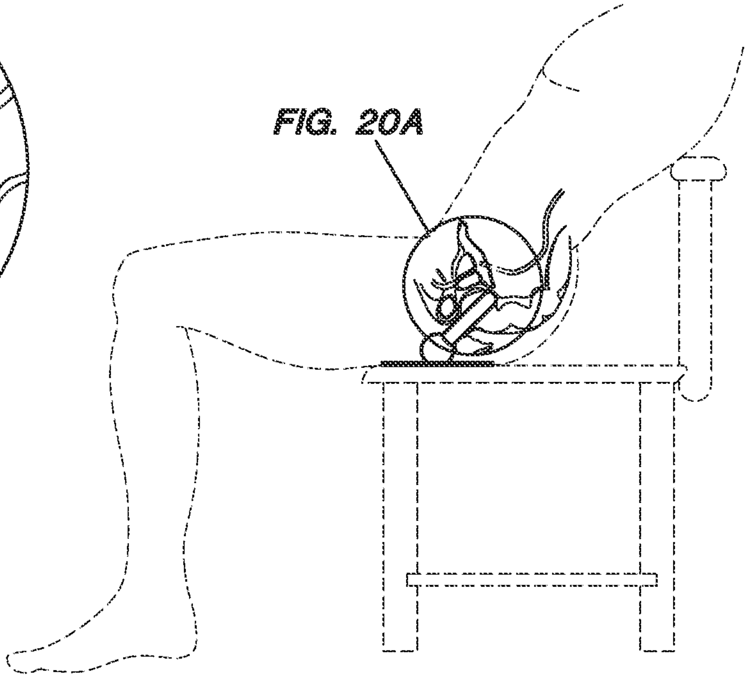
FIG. 20 is a plan view illustrating the extra rectal compression probe shown in FIG. 18.

An extra rectal compression probe 700 is illustrated in FIGS. 17-19. During use, the extra rectal compression probe 700 is positioned below the rectum, without insertion therein, and the user sits on it for transmitting ventrally directed force on the posterior side of the prostate. Probe 700 is comprised of a proximal end and a distal end and a circumference sufficiently great to prevent insertion into the anus wherein the distal end is comprised of a rounded shape for contacting the anus and the proximal end having a flat truncated shape for stabilization. The force generated by the extra rectal compression probe 700 upon the prostate is generally less direct than the force generated by an intra rectal compression probe.

Figure 22:
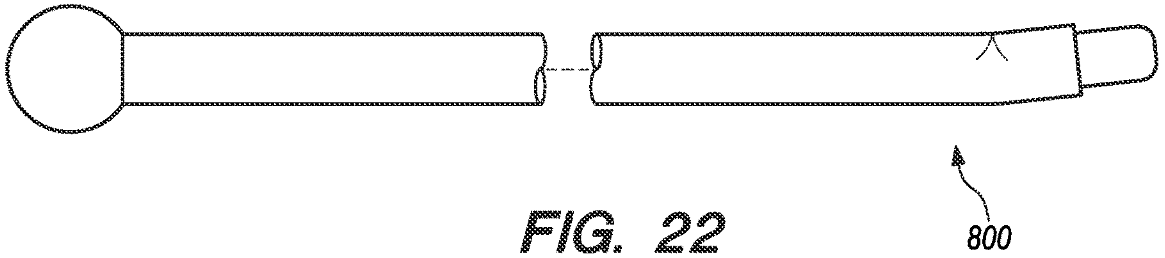
FIG. 22 is a plan view illustrating the abdominal compression probe in FIG. 1 having no vibrator.
Figure 23:
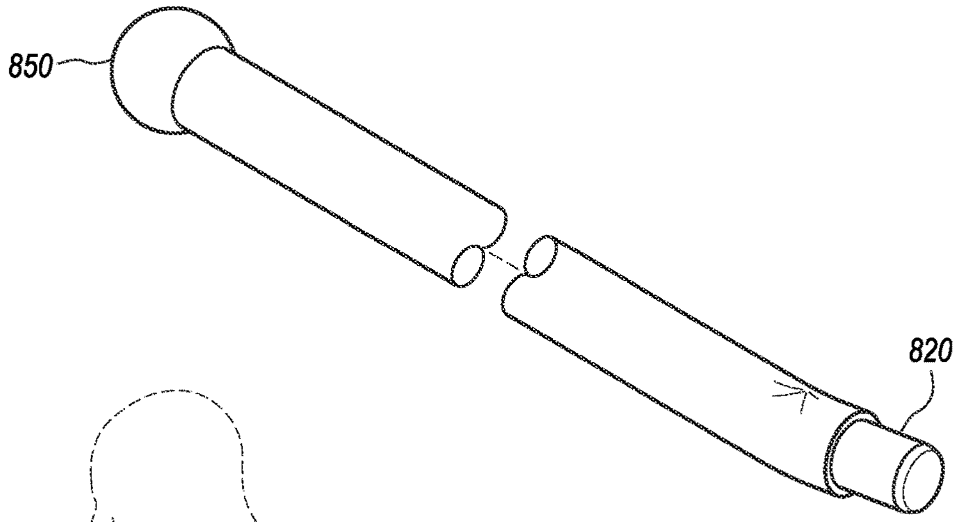
FIG. 23 is a perspective view illustrating the abdominal compression probe in FIG. 22.

The dorsally directed force on the anterior side of the prostate is achieved with an abdominal compression probe. The abdominal compression probe may be either motorized with a vibrator or may lack a motorized vibrator. An abdominal compression probe without a motorized vibrator feature is illustrated in FIG. 22-23. Use of the non-motorized abdominal compression probe is demonstrated in FIG. 24

Figure 21A:
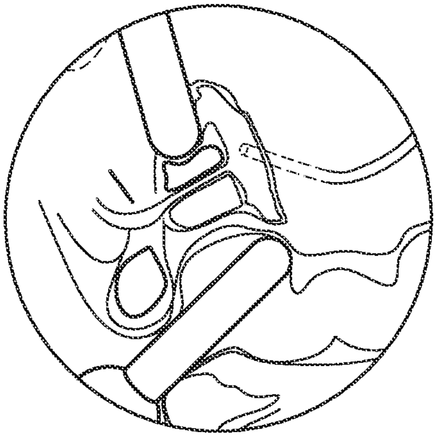
FIG. 21A is an expanded sectional view illustrating the simultaneous use of the rectal compression probe in FIG. 21 for transmitting ventrally directed force on the posterior side of the prostate and of the abdominal compression probe in FIG. 2 for applying dorsally directed force on the hypogastric region of the abdomen for transmitting a force in the dorsal direction upon the anterior side of the prostate.
Figure 21B:
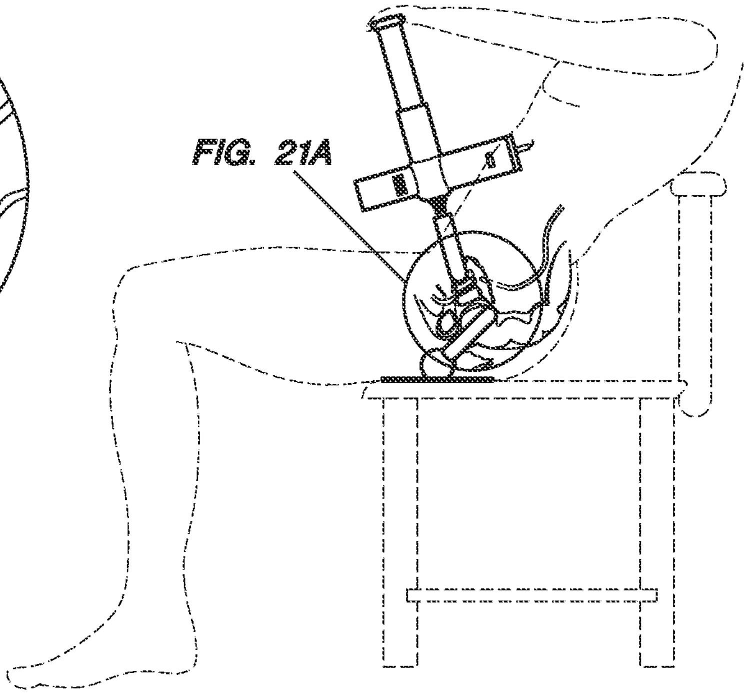
FIG. 21B is a plan view illustrating the simultaneous use of the rectal compression probe in FIG. 20B positioned on a chair during use, together with the abdominal compression probe in FIG. 2.
Figure 24:
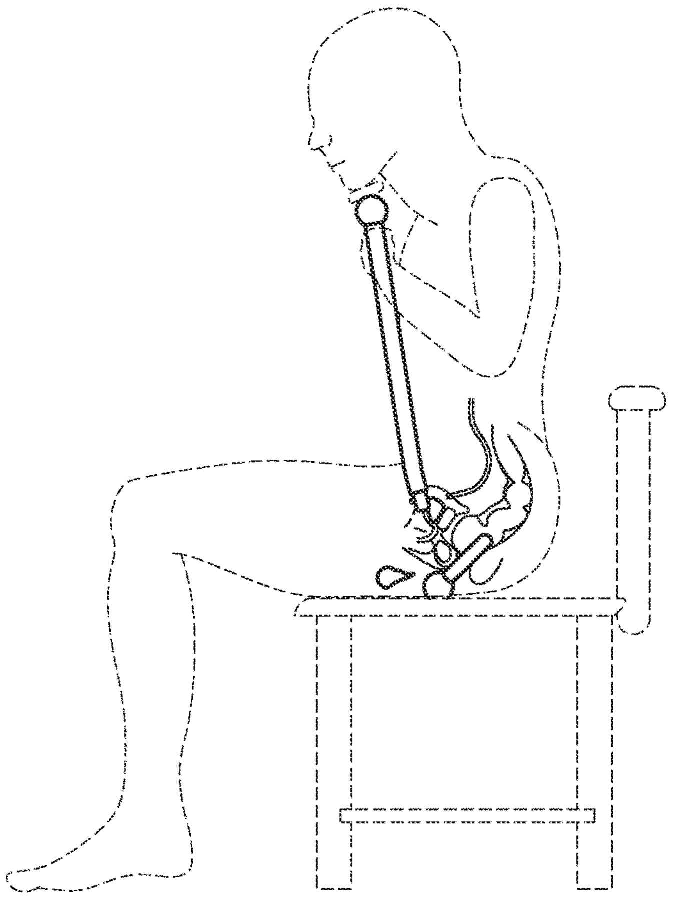
FIG. 24 is a plan view illustrating the abdominal compression probe in FIG. 23 for applying dorsally directed force on the hypogastric region of the abdomen for transmitting a force in the dorsal direction upon the anterior side of the prostate.

During use the abdominal compression probe is employed for applying force in the dorsal direction on the hypogastric region of the abdomen for transmitting a force in the dorsal direction upon the anterior side of the prostate. The use of an abdominal compression probe having a motorized vibrator is illustrated in FIGS. 2111 and 21A. The use of an abdominal compression probe lacking a motorized vibrator is illustrated in FIG. 24.

To achieve bidirectional compression of the prostate, both a rectal compression probe and an abdominal compression probe are required. However, any of the rectal compression probes disclosed herein may be employed with any of the abdominal compression probes disclosed herein.

For user convenience, a rectal compression probe and an abdominal compression probe may be supplied as a kit containing both items, so that the use has both tools required to achieve bidirectional prostate compression. However, the rectal compression probe contained within the kit may be intra rectal or extra rectal. Similarly, the abdominal compression probe may be motorized with a vibrator or may be unmotorized and lack a vibrator.

The invention is also directed to a method for compressing a prostate of a human subject, the prostate having an anterior side and a posterior side, the human subject having:

a rectum with an anterior wall dorsal to the posterior side of the prostate; and an abdomen with a hypogastric region ventral to the posterior side of the prostate;

the method comprising the following steps:

Step A: applying force with an intra-rectal compression probe inserted into the rectum, the force being applied in the ventral direction onto the anterior wall of the rectum for transmitting force in the ventral direction upon the posterior side of the prostate; while simultaneously Step B: applying force with an abdominal compression probe, the force being applied in the dorsal direction on the hypogastric region of the abdomen for transmitting force in the dorsal direction upon the anterior side of the prostate, whereby simultaneous use of the intra-rectal compression probe and the abdominal compression probe for simultaneously transmitting ventrally directed force on the posterior side of the prostate and dorsally directed force on the anterior sides of the prostate causes the prostate to compress. In Step B, the abdominal compression probe may be motorized for applying force onto the hypogastric region of the abdomen. Further in Step B, the abdominal compression probe is not motorized for applying force onto the hypogastric region of the abdomen.

The invention is further directed to a method for compressing a prostate of a human subject, the prostate having an anterior side and a posterior side, the human subject having:

an anus posterior side of the prostate; and an abdomen with a hypogastric region ventral to the posterior side of the prostate;

the method comprising the following steps:

Step A: applying force with an extra-rectal compression probe in abutting contact with the anus, the force being applied ventrally across the anus onto the posterior side of a prostate of a human subject; while simultaneously Step B: applying force with an abdominal compression probe for applying force in the dorsal direction on the hypogastric region of the abdomen for transmitting a force in the dorsal direction upon the anterior side of the prostate, whereby simultaneous use of the extra-rectal compression probe and the abdominal compression probe for simultaneously transmitting ventrally directed force on the posterior side of the prostate and dorsally directed force on the anterior sides of the prostate causes the prostate to compress. In Step B, the abdominal compression probe may be motorized for applying force onto the hypogastric region of the abdomen. Further in Step B, the abdominal compression probe is not motorized for applying force onto the hypogastric region of the abdomen.

What is claimed is:

1. A kit comprising an assembly of tools for compressing a prostate of a human subject, the assembly including:

a rectal compression probe for applying force in the ventral direction on the anterior wall of the rectum for transmitting a force in the ventral direction upon the posterior side of the prostate; and an abdominal compression probe for applying force in the dorsal direction on the hypogastric region of the abdomen for transmitting a force in the dorsal direction upon the anterior side of the prostate, whereby simultaneous use of the rectal compression probe and the abdominal compression probe for simultaneously transmitting ventrally directed force on the posterior side of the prostate and dorsally directed force on the anterior sides of the prostate causes the prostate to compress:

wherein the rectal compression probe is an extra-rectal compression probe employable for transmitting ventrally directed force on the posterior side of a prostate of a human subject, the extra-rectal compression probe including:

a non-insertion rod having a proximal end and a distal end and a circumference sufficiently great to prevent insertion into the anus, the distal end having a rounded shape for contacting the anus, the proximal end of said rod having a flat truncated shape for stabilizing said rod.

2. The kit as described in claim 1 wherein abdominal compression probe is employable for transmitting dorsally directed force on the anterior side of the prostate of a human subject, the abdominal compression probe including:

a shaft having a proximal end and a distal end, the distal end having a rounded shape for contacting the hypogastric region of the subject's abdomen and applying dorsally directed force thereupon, and a vibrational motor having two opposing lateral sides, a top side, and a bottom side, the bottom side of said vibrational motor being attached to the proximal end of said shaft for transmitting vibration from the vibration motor to said shaft;

two opposing handles, each handle being transversely attached respectively to one of the lateral sides of said vibrational motor and being adapted to be held by the subject's hands for holding said vibrational motor and for transmitting dorsally directed force upon said vibrational motor and said shaft;

a telescoping vertical member having a proximal end and a distal end, the proximal end of said telescoping vertical member being attached to the top side of said vibrational motor, the distal end of said telescoping vertical member having a rounded shape adapted for engagement below the subject's chin for enabling the subject to exert downward force with the chin upon said telescoping vertical member and said vibrating motor, said telescoping vertical member having an adjustable length for adapting the length between said vibrating motor and the subject's chin, whereby application of dorsally directed force by the subject upon said handles and said telescoping vertical member while simultaneously contacting the distal end of said shaft upon the hypogastric region of the subject's abdomen and while simultaneously operating the vibrational motor transmits both vibrations and force in the dorsal direction upon the anterior side of the prostate.

3. The kit as described in claim 1 wherein abdominal compression probe is employable for transmitting dorsally directed force on the anterior side of the prostate of a human subject, the abdominal compression probe for applying force in the dorsal direction on the hypogastric region of the abdomen for transmitting a force in the dorsal direction upon the anterior side of the prostate, the abdominal compression probe including:

a shaft having a proximal end and a distal end, the distal end having a rounded shape for contacting the hypogastric region of the subject's abdomen and applying dorsally directed force thereupon, and a telescoping vertical member having a proximal end and a distal end, the proximal end of said telescoping vertical member being attached to said shaft, the distal end of said telescoping vertical member having a rounded shape adapted for engagement below the subject's chin for enabling the subject to exert downward force with the chin upon said telescoping vertical member and said shaft, said telescoping vertical member having an adjustable length for adapting the length between said shaft and the subject's chin, whereby application of dorsally directed force by the subject upon said telescoping vertical member while simultaneously contacting the distal end of said shaft upon the hypogastric region of the subject's abdomen transmits force in the dorsal direction upon the anterior side of the prostate.

* * * * *